US010091748B2

(12) United States Patent
Otomo et al.

(10) Patent No.: US 10,091,748 B2
(45) Date of Patent: Oct. 2, 2018

(54) COMMUNICATIONS NODE, SYSTEM, AND SYNCHRONIZING METHOD

(71) Applicant: FUJITSU LIMITED, Kawasaki-shi, Kanagawa (JP)

(72) Inventors: Toshiya Otomo, Kawasaki (JP); Koichiro Yamashita, Hachioji (JP); Takahisa Suzuki, Yokohama (JP); Hiromasa Yamauchi, Kawasaki (JP)

(73) Assignee: FUJITSU LIMITED, Kawasaki-Shi (JP)

( * ) Notice: Subject to any disclaimer, the term of this patent is extended or adjusted under 35 U.S.C. 154(b) by 68 days.

(21) Appl. No.: 15/204,233

(22) Filed: Jul. 7, 2016

(65) Prior Publication Data

US 2016/0316443 A1    Oct. 27, 2016

Related U.S. Application Data

(63) Continuation of application No. PCT/JP2014/050929, filed on Jan. 20, 2014.

(51) Int. Cl.
*H04J 3/06* (2006.01)
*H04W 56/00* (2009.01)
(Continued)

(52) U.S. Cl.
CPC .......... *H04W 56/001* (2013.01); *H04W 4/70* (2018.02); *H04W 52/028* (2013.01);
(Continued)

(58) Field of Classification Search
CPC .......... H04W 56/001; H04W 52/0216; H04W 52/0229; H04W 4/005; H04W 52/0219; H04W 52/028; H04W 84/18; Y02B 60/50
See application file for complete search history.

(56) References Cited

U.S. PATENT DOCUMENTS

2005/0268118 A1* 12/2005 Zebelloni ............... G08C 17/02
                                                              713/300
2006/0205421 A1  9/2006 Record
(Continued)

FOREIGN PATENT DOCUMENTS

JP    5-292564    11/1993
JP    2005-535251    11/2005
(Continued)

OTHER PUBLICATIONS

International Search Report dated Mar. 18, 2014, in corresponding International Application No. PCT/JP2014/050929.
(Continued)

*Primary Examiner* — Afshawn M Towfighi
(74) *Attorney, Agent, or Firm* — Staas & Halsey LLP

(57) ABSTRACT

Among plural communications nodes that transfer data to a communications apparatus by multihop communication, a communications node includes a transmitting circuit configured to transmit a synchronization request signal requesting transmission of a synchronization signal for synchronizing the multihop communication at the communications node; a receiving circuit configured to receive the synchronization signal in response to the synchronization request signal transmitted by the transmitting circuit; and a power control circuit configured to control the receiving circuit such that a state of the receiving circuit is a first state where power consumption of the receiving circuit is a first power before the transmitting circuit transmits the synchronization request signal and is a second state where the power consumption of the receiving circuit is a second power that is higher than the first power after the transmitting circuit transmits the synchronization request signal.

9 Claims, 13 Drawing Sheets

(51) Int. Cl.
*H04W 52/02* (2009.01)
*H04W 4/70* (2018.01)
*H04W 84/18* (2009.01)

(52) U.S. Cl.
CPC ... *H04W 52/0216* (2013.01); *H04W 52/0219* (2013.01); *H04W 52/0229* (2013.01); *H04W 84/18* (2013.01); *Y02D 70/00* (2018.01)

(56) References Cited

U.S. PATENT DOCUMENTS

2009/0168747 A1* 7/2009 Kimura .............. H04B 7/2696
                                                        370/350
2012/0119902 A1    5/2012 Patro et al.

FOREIGN PATENT DOCUMENTS

| JP | 2005-348186 | 12/2005 |
| JP | 2007-515863 | 6/2007 |
| JP | 2008-306657 | 12/2008 |
| JP | 2011-176630 | 9/2011 |
| JP | 2012-525759 | 10/2012 |
| WO | WO 2007/066637 A1 | 6/2007 |

OTHER PUBLICATIONS

Written Opinion of the International Searching Authority dated Mar. 18, 2014, in corresponding International Application No. PCT/JP2014/050929.
Taiwanese Office Action dated Jan. 14, 2016 in corresponding Taiwanese Patent Application No. 103146021.

* cited by examiner

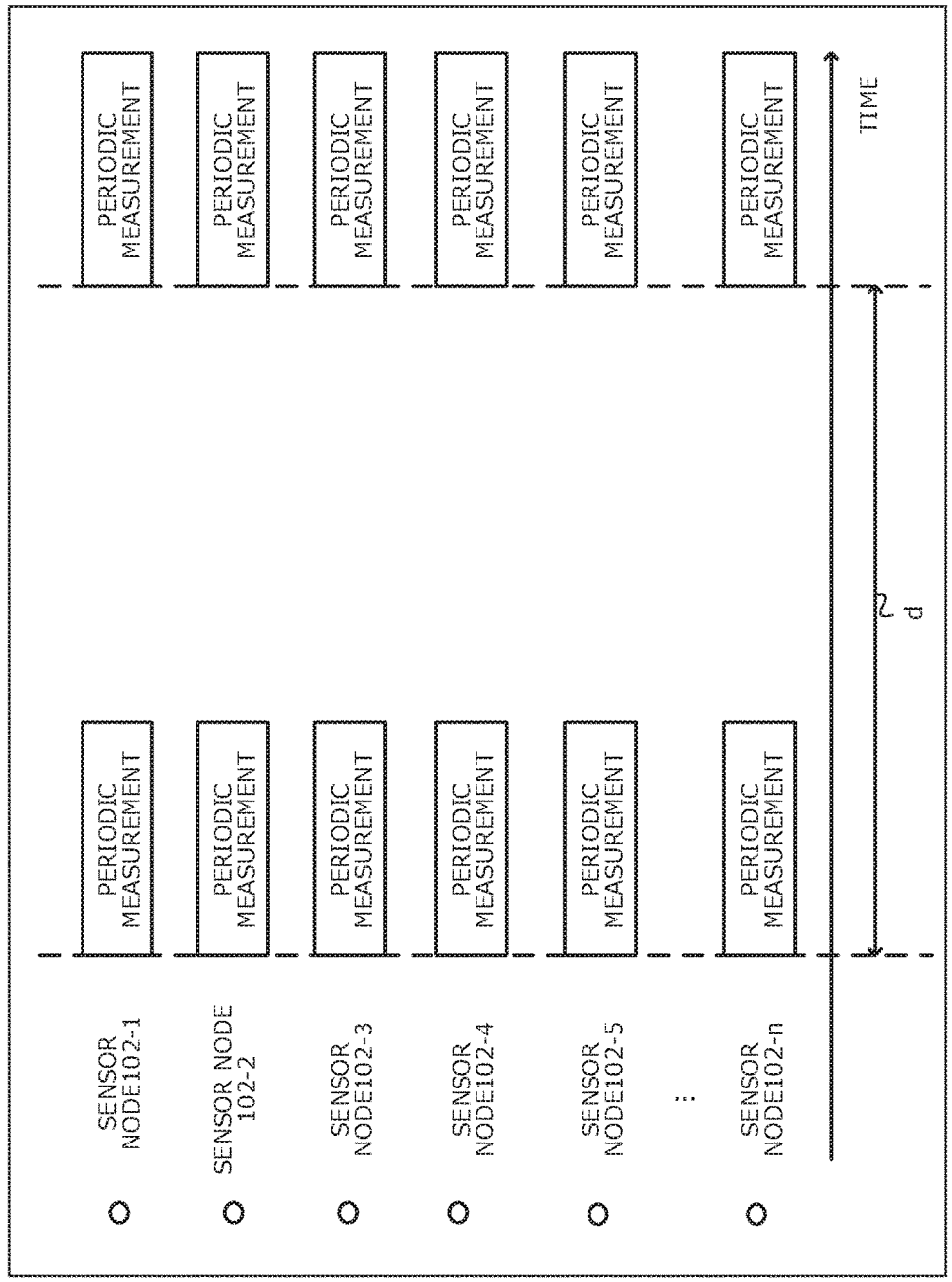

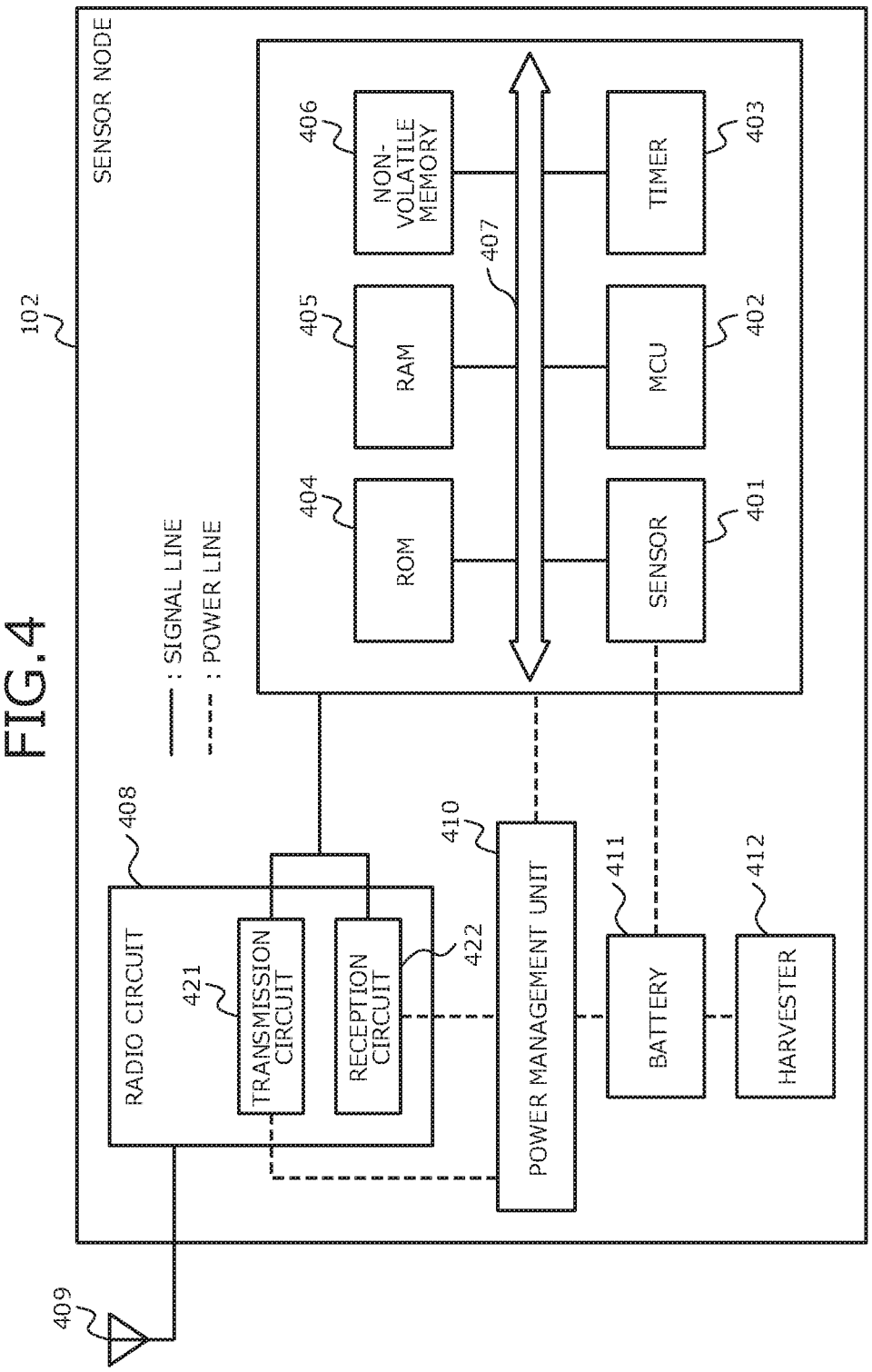

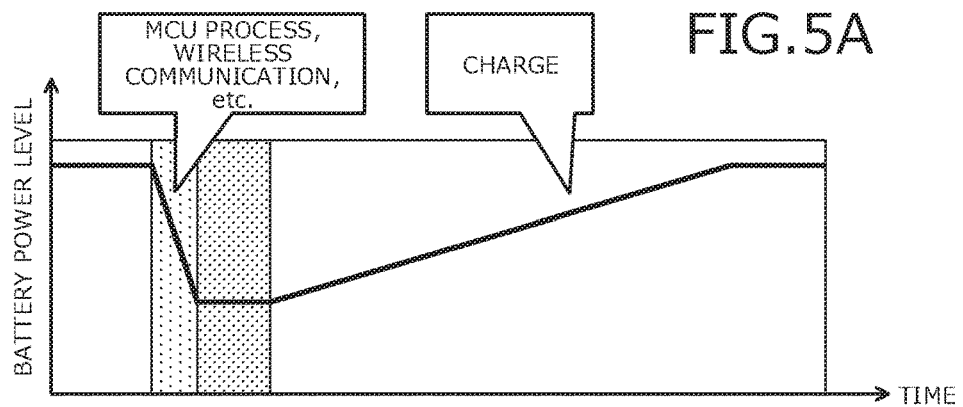
FIG.5A
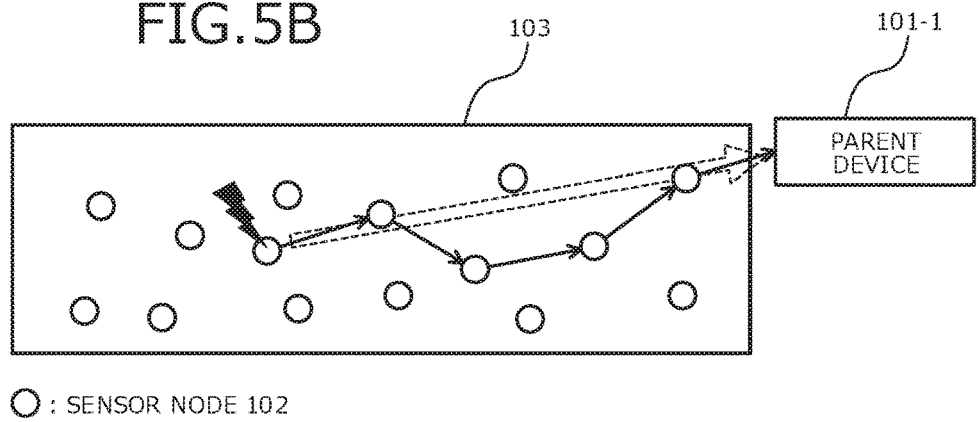
FIG.5B
FIG.6
| COMPONENT | POWER STATE | | |
|---|---|---|---|
| MCU | ON | SLEEP | OFF |
| RECEPTION CIRCUIT | ON | OFF | - |
| SENSOR | ON | OFF | - |

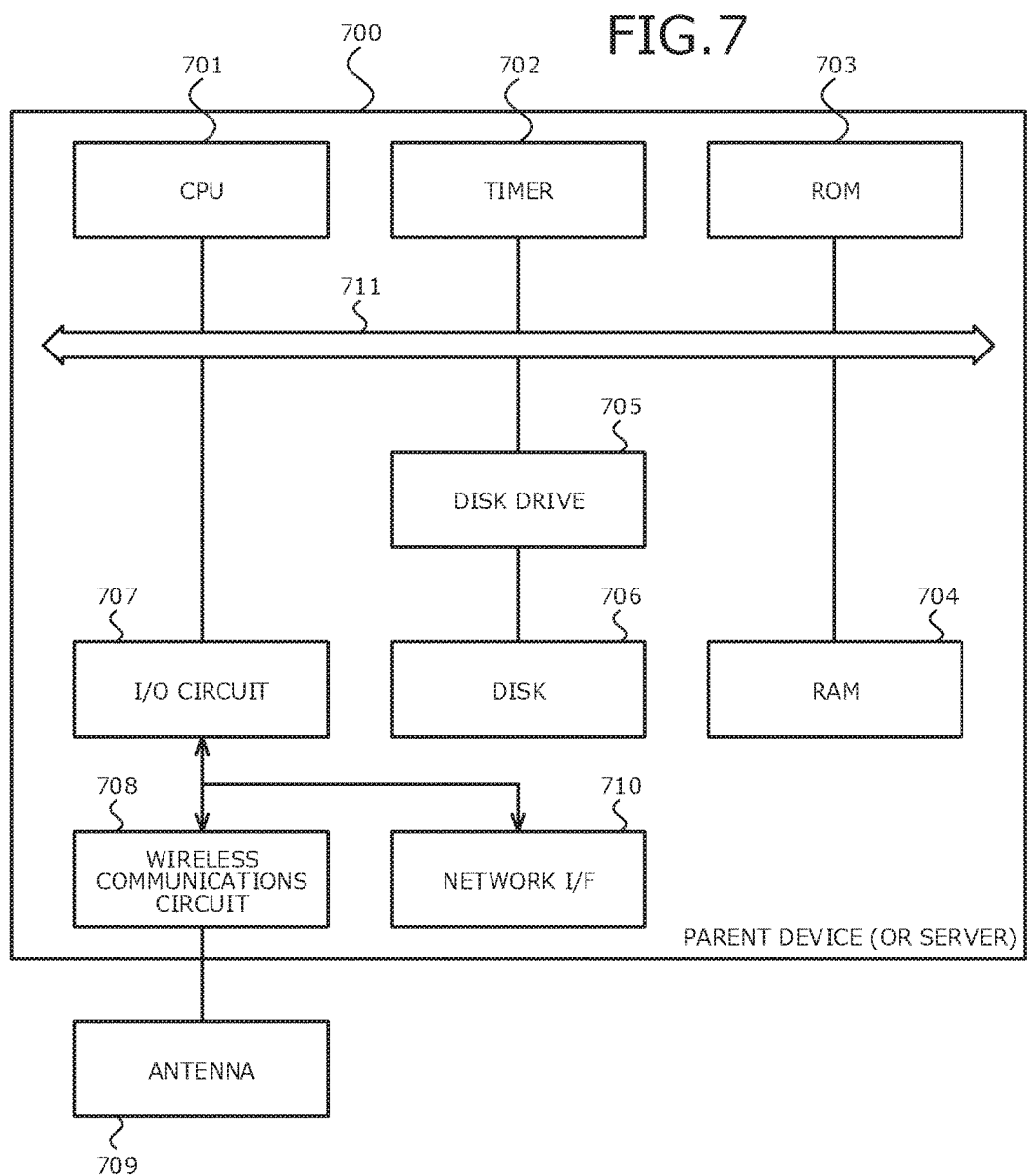

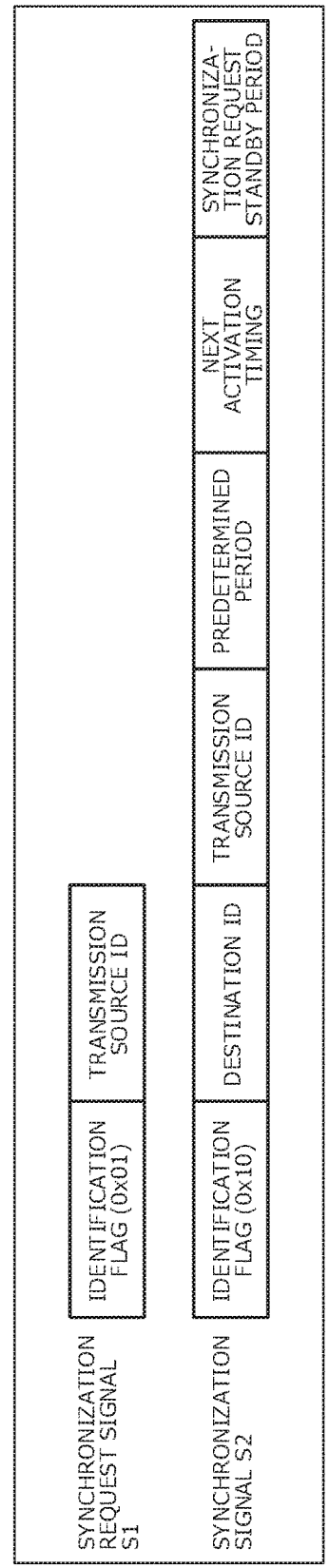

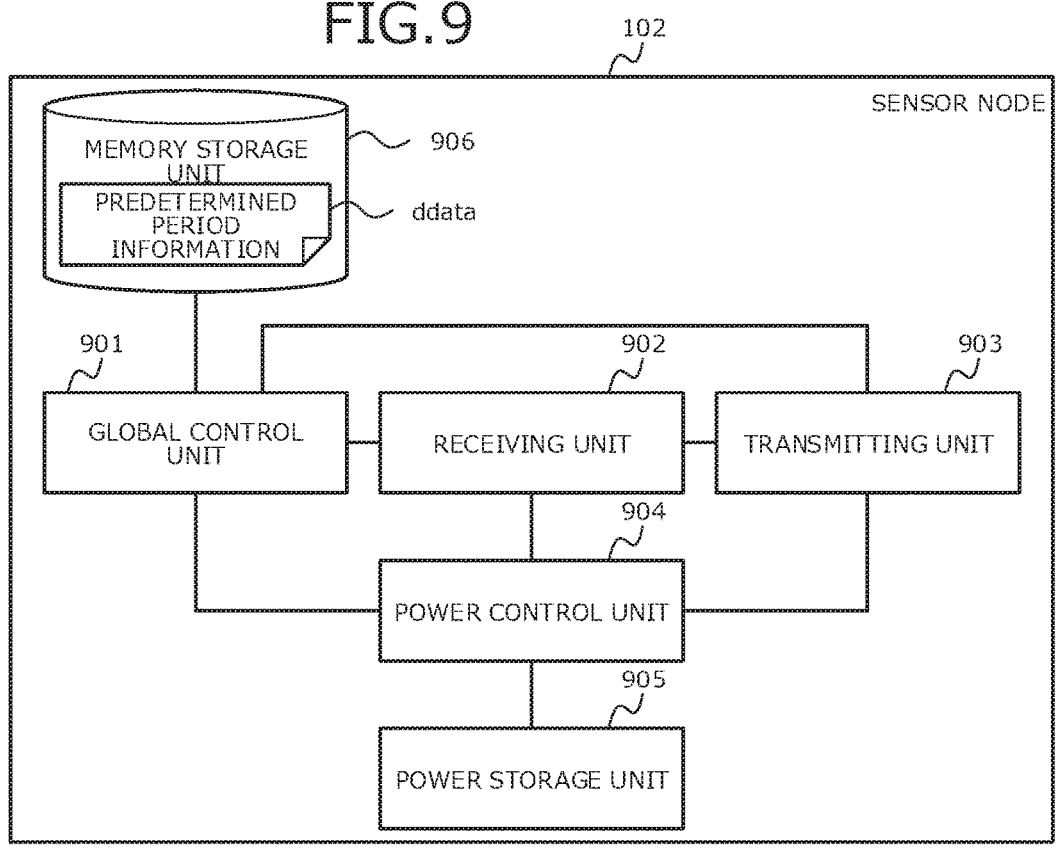
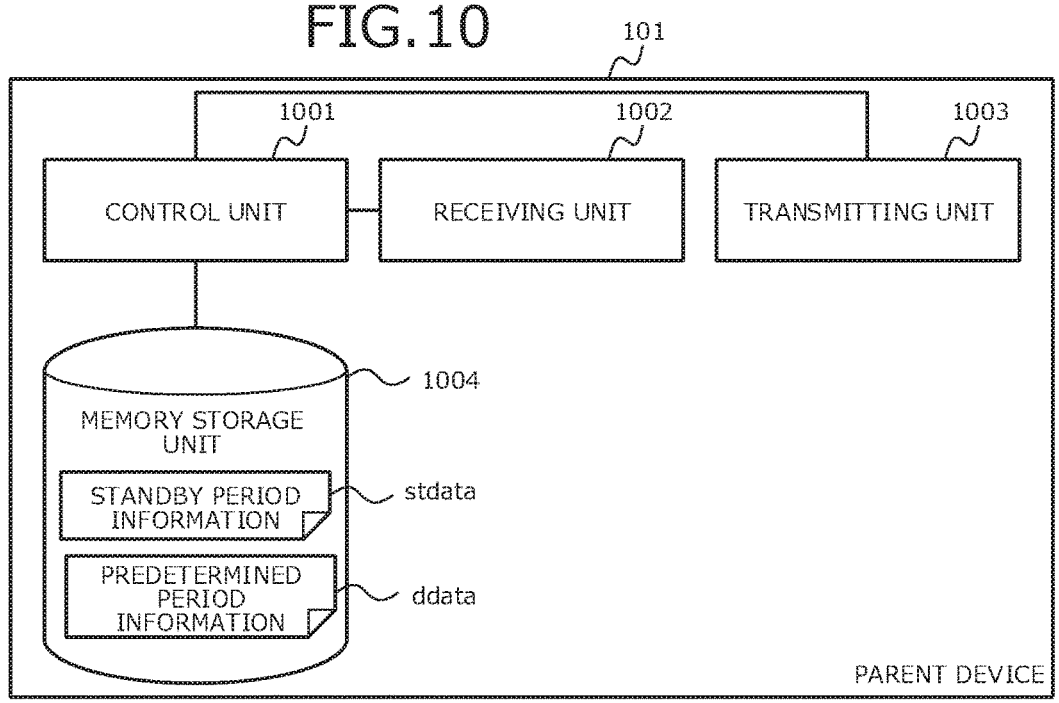

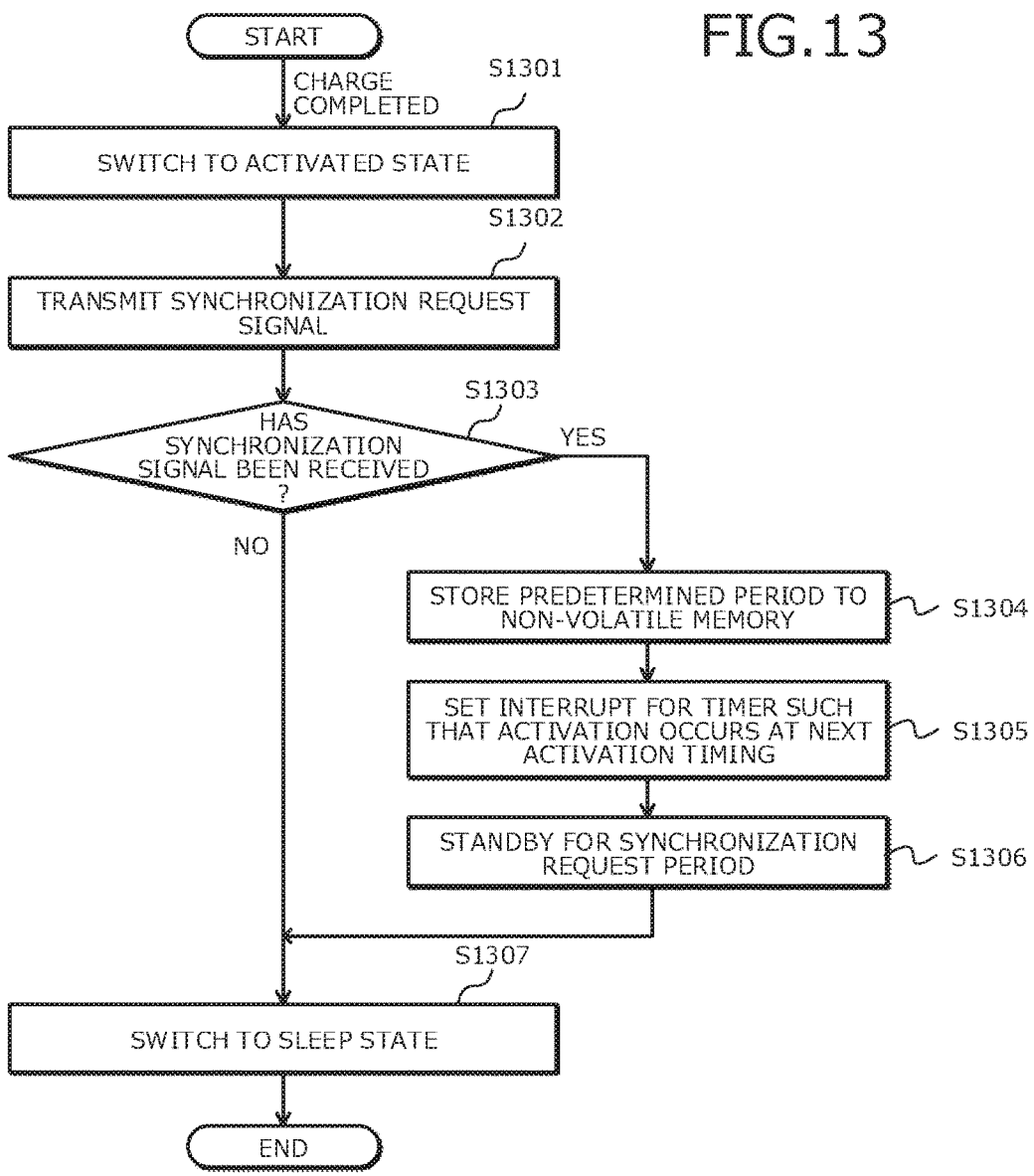

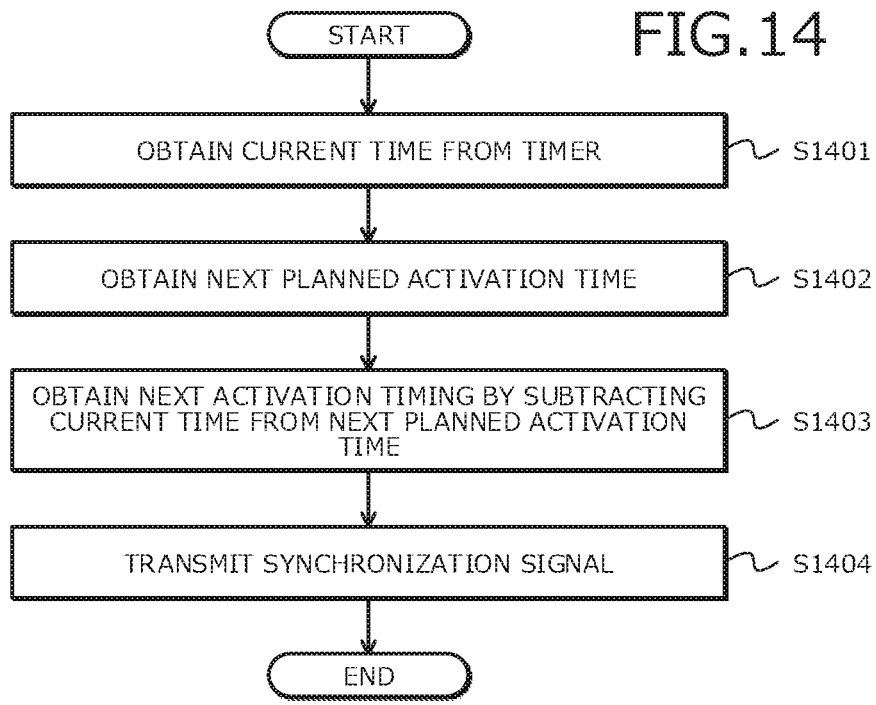
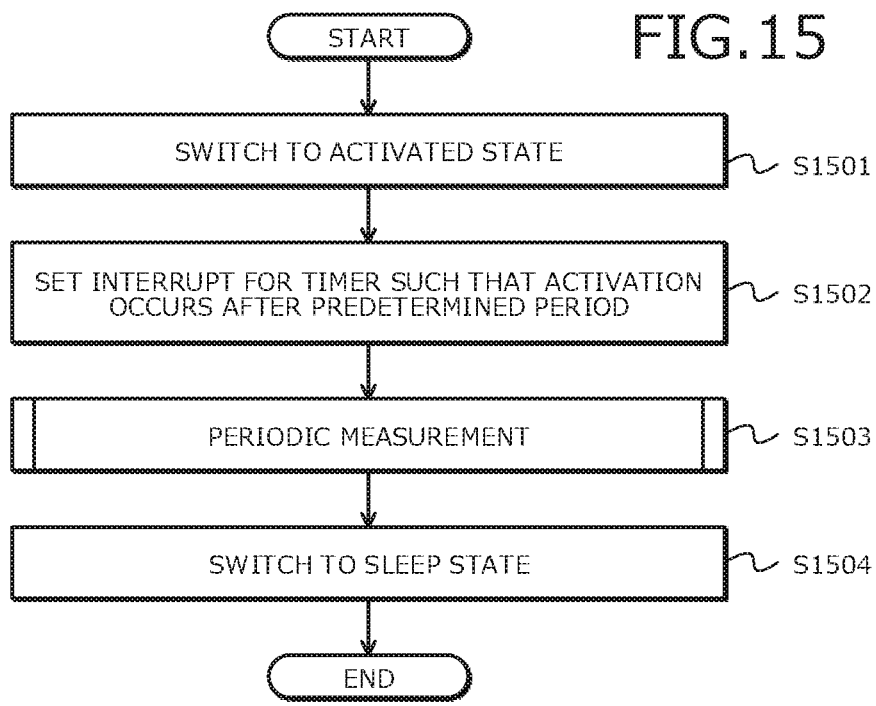

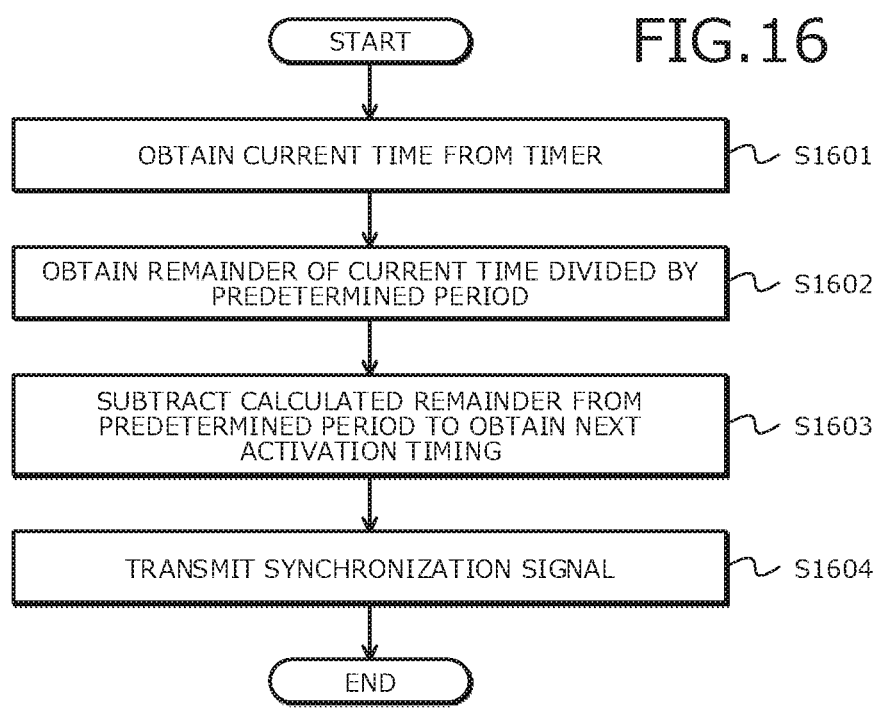

COMMUNICATIONS NODE, SYSTEM, AND SYNCHRONIZING METHOD

CROSS REFERENCE TO RELATED APPLICATIONS

This application is a continuation application of International Application PCT/JP2014/050929, filed on Jan. 20, 2014 and designating the U.S., the entire contents of which are incorporated herein by reference.

FIELD

The embodiments discussed herein relate to a communications node, a system, and a synchronizing method.

BACKGROUND

In sensor network systems, changes in the environment of an area where a large number of wireless sensor nodes are disposed are detected by the sensor nodes. A related technique of transmitting data to a sensor node that is not directly connected to by relay transfer via multihop communication among sensor nodes is known.

According to another technique, a wireless node sets an internal clock by a synchronization signal transmitted from a host and switches a power saving mode and a regular mode (for example, refer to Japanese Laid-Open Patent Publication No. 2008-306657).

A further technique is known where in remote measuring, a portable receiver uses a timer and based on a synchronization message transmitted from a remote transmitter, measures the time until the next message is received. Further, when reception is to be performed, power supply to a receiver that is OFF is turned ON and the receiver is operated (for example, refer to Published Japanese-Translation of PCT Application, Publication No. 2007-515863).

According to another known technique, a wireless sensor uses a clock time received from a high order station and corrects time deviations at the wireless sensor after a sufficient period of time has elapsed since powering on. The wireless sensor further reflects the corrections on the driving time of the wireless sensor (for example, refer to Japanese Laid-Open Patent Publication No. 2005-348186).

According to another known technique, at a remote controller receiver, signal standby is performed intermittently whereby a reduction of power consumption for signal standby can be facilitated, enabling battery life to be extended (for example, refer to Japanese Laid-Open Patent Publication No. H5-292564).

Nonetheless, conventionally, in a system where communications nodes receive a synchronization signal transmitted from a communications apparatus that aggregates data of the communications nodes and the timing when the synchronization signal is transmitted is unknown, the communications nodes remain in reception standby continuously for long periods of time, arising in a problem that the capacity of the battery of the communications nodes has to be large.

SUMMARY

According to an aspect of an embodiment, among plural communications nodes that transfer data to a communications apparatus by multihop communication, a communications node includes a transmitting circuit configured to transmit a synchronization request signal requesting transmission of a synchronization signal for synchronizing the multihop communication at the communications node; a receiving circuit configured to receive the synchronization signal in response to the synchronization request signal transmitted by the transmitting circuit; and a power control circuit configured to control the receiving circuit such that a state of the receiving circuit is a first state where power consumption of the receiving circuit is a first power before the transmitting circuit transmits the synchronization request signal and is a second state where the power consumption of the receiving circuit is a second power that is higher than the first power after the transmitting circuit transmits the synchronization request signal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram of an operation example of the system 100;

FIG. 4 is a block diagram of an example of hardware configuration of a sensor node 102;

FIGS. 5A and 5B are diagrams of an example of assumed operation of the sensor node 102;

FIG. 6 is a diagram of an example of power states of components;

FIG. 7 is a block diagram of an example of hardware configuration of a server 201 and a parent device 101;

FIG. 8 is a diagram of an example of packet configuration;

FIG. 9 is a diagram of an example of a functional configuration of the sensor node 102;

FIG. 10 is a diagram of an example of a functional configuration of the parent device 101;

FIG. 13 is a flowchart of an example of a process procedure performed by the sensor node 102 when synchronization has not been completed;

FIG. 14 is a flowchart of a process procedure of the sensor node 102 during standby for a synchronization request;

FIG. 15 is a flowchart of an example of a process procedure performed by the sensor node 102 when synchronization has been completed; and FIG. 16 is a flowchart of an example of a process procedure performed by the parent device 101.

DESCRIPTION OF THE INVENTION

Embodiments of a communications node, a system, and a synchronizing method of the present invention will be described in detail with reference to the accompanying drawings.

Figure 1:
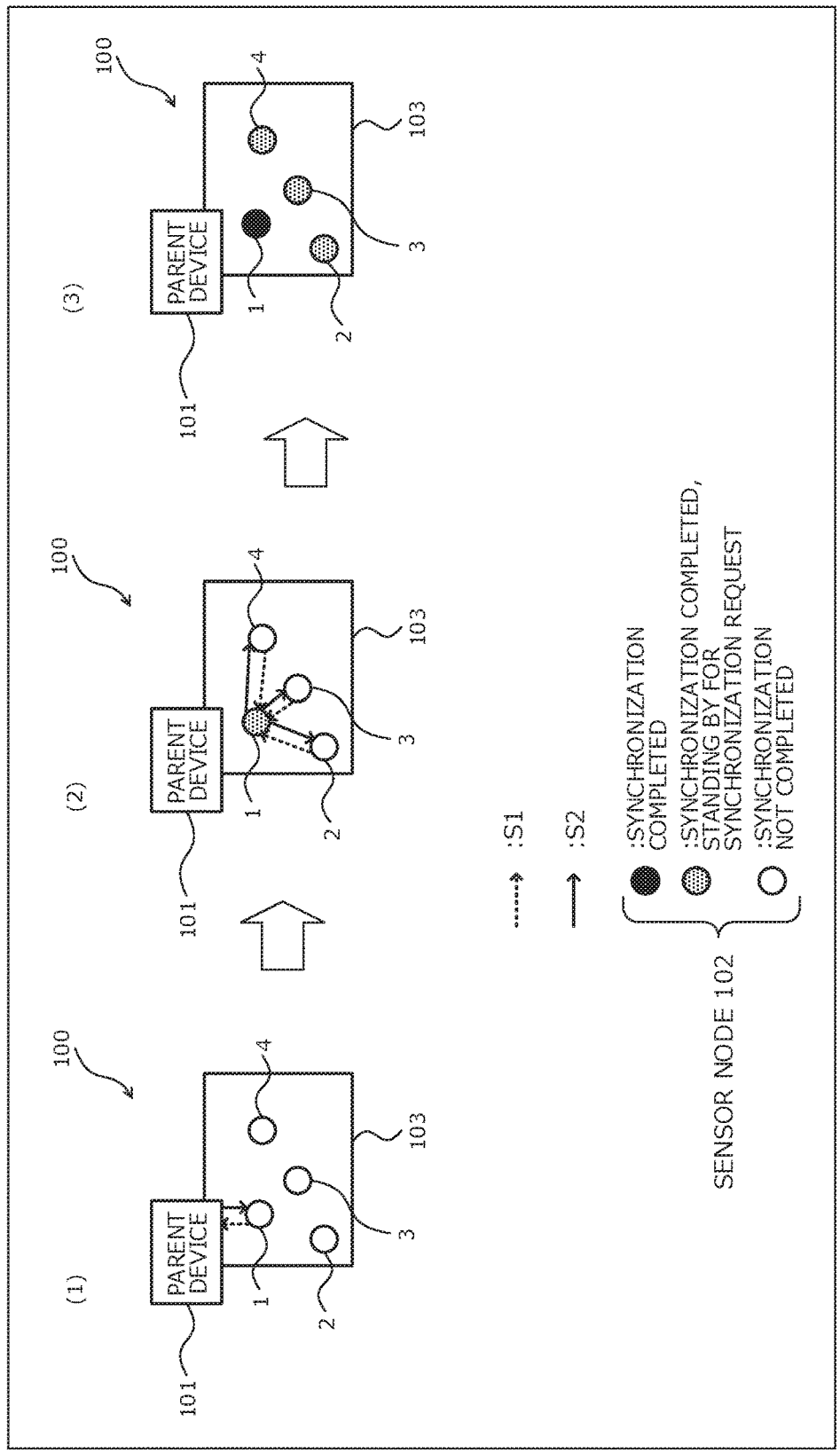
FIG. 1 is a diagram of an operation example of a system according to the present invention.
Figure 2:
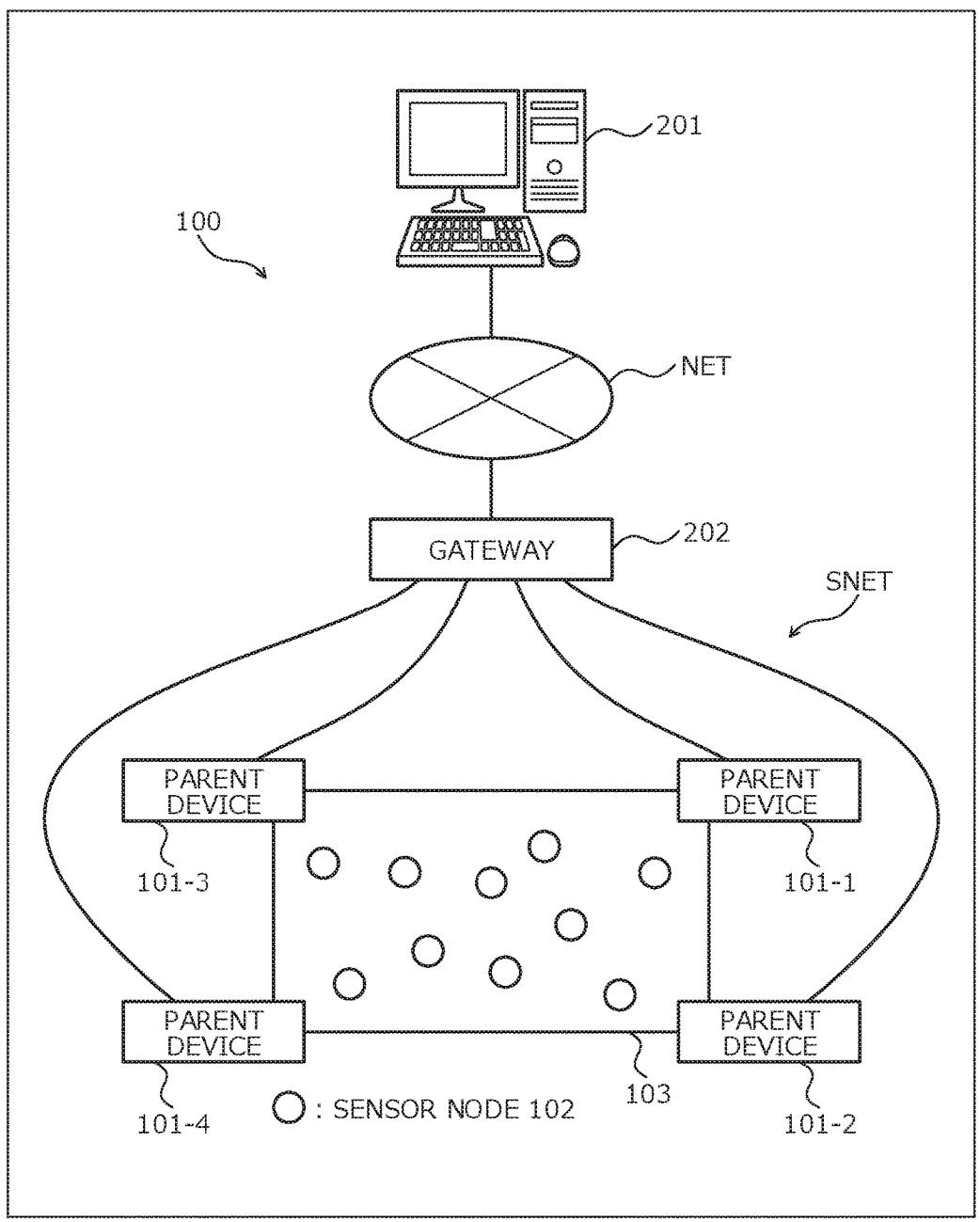
FIG. 2 is a diagram of an example of a system 100 according to the present invention.

FIG. 1 is a diagram of an operation example of the system according to the present invention. A system 100 is a sensor network system in which sensor nodes 102 having a sensor and a small-scale wireless communications circuit form a sensor network SNET, and is configured to collect data of the sensors. The system 100 has the plural sensor nodes 102 and a parent device 101. Each sensor node 102 is a wireless communications node having a sensor and disposed in an arrangement area 103. In the example depicted in FIG. 1, sensor nodes 102-1 to 102-4 are disposed in the arrangement area 103. For example, each sensor node 102 charges a battery with internally generated power. The parent device 101 is a communications apparatus for collecting sensor data from the plural sensor nodes 102. A detailed example of the system 100 is depicted in FIG. 2. In the system 100, at each predetermined period, the plural sensor nodes 102 are used to measure a state of the arrangement area 103. Measurement, for example, may be of temperature, humidity, pressure, light, and the like. More specifically, measurement data and the like are transferred to the parent device 101 by performing multihop communication by the plural sensor nodes 102.

Thus, to use the plural sensor nodes 102 to measure the arrangement area 103 at each predetermined period, the multihop communication has to be synchronized among the plural sensor nodes 102. As described, conventionally, when a synchronization signal S2 that synchronizes the multihop communication performed by the plural sensor nodes 102 is transmitted from the parent device 101 to the sensor nodes 102, the sensor nodes 102 have to be operated from a construction process until synchronization is achieved. The construction process is a process of disposing the sensor nodes 102 in the arrangement area 103. In this case, the capacity of the batteries equipped in the sensor nodes 102 becomes large. Further, for example, the power supply of the sensor nodes 102 may be turned on manually. However, for example, when the sensor nodes 102 are embedded in the arrangement area 103, the power of the sensor nodes 102 cannot be turned on manually. Further, for example, when the sensor nodes 102 are of a great number, manual work is not realistic.

Thus, in the present embodiment, the sensor nodes 102 switch a receiving unit from an OFF state to an ON state and request transmission of the synchronization signal S2 whereby, the synchronization signal S2 is received, enabling the interval during which the receiving unit is continuously in the ON state to be shortened. As a result, battery saving can be facilitated.

When the remaining capacity of the equipped battery is a predetermined level or greater, the sensor node 102 controls the receiving unit such that the state of the receiving unit changes from a state where power consumption of the receiving unit of the sensor node 102 is a first state, which is a first power, to a second state, which is a second power that is higher than the first power. The predetermined level, for example, is defined by a designer of the sensor nodes 102. For example, the predetermined level is 4/5 of the capacity of the battery. Here, the first state is when the receiving unit is in the OFF state and the second state is when the receiving unit is in the ON state. The sensor node 102 transmits a synchronization request signal S1 that requests transmission of the synchronization signal S2 for synchronizing multihop communication. The sensor node 102 receives the synchronization signal S2 in response to the synchronization request signal S1. As depicted at (1) of FIG. 1, for example, the sensor node 102-1 receives from the parent device 101, via the receiving unit, the synchronization signal S2 in response to the transmitted synchronization request signal S1. Detailed examples of configuration of the synchronization signal S2 and the synchronization request signal S1 will be described with reference to FIG. 8. Although the sensor nodes 102-2 to 102-4 also transmit the synchronization request signal S1, the synchronization request signals S1 do not reach the parent device 101. Therefore, when the receiving unit has not received the synchronization signal S2 before a certain period elapses after the synchronization request signal S1 is transmitted, the sensor node 102 controls the receiving unit such that the state of the receiving unit becomes the first state. The certain period, for example, is a value determined by a designer of the system 100 or a user of the system 100.

Further, for example, when the receiving unit receives a synchronization request signal S1 from another sensor node 102 after receiving the synchronization signal S2, the sensor node 102 transmits a synchronization signal S2 that is in response the received synchronization request signal S1 and that is based on the received synchronization signal S2. In the example at (2) in FIG. 1, the sensor node 102-1 receives each of the synchronization request signals S1 transmitted from the sensor nodes 102-2 to 102-4. The sensor node 102-1 transmits a synchronization signal S2 that is for the received synchronization request signals S1 and that is based on the synchronization signal S2 received from the parent device 101. Thus, even when a synchronization request signal S1 that cannot reach the parent device 101 is transmitted, the synchronization signal S2 can be received. Therefore, the transmission power for transmitting the synchronization request signal S1 and the synchronization signal S2 may be small, enabling power savings to be facilitated.

Further, for example, after the certain period elapses from the reception of the synchronization signal S2 by the receiving unit, the sensor node 102 controls the receiving unit such that the state of the receiving unit becomes the first state. In the example at (3) in FIG. 1, the sensor node 102-1 is not already in a state enabling reception of the synchronization request signal S1. Further, at (3) in FIG. 1, the sensor nodes 102-2 to 102-4 are in states enabling reception of the synchronization request signal S1.

Thus, the sensor nodes 102 receive the synchronization signal S2 by switching the receiving unit from the OFF state to the ON state and request transmission of the synchronization signal S2 whereby, the interval during which the receiving unit is continuously in the ON state can be reduced. Therefore, compared to a case where the synchronization signal S2 is transmitted at a timing when all of the sensor nodes 102 can receive the synchronization signal S2, the receiving operation by the receiving unit need not be maintained until that timing. Further, compared to a case where the synchronization signal S2 is transmitted at the timing when the construction process is completed, the receiving operation by the receiving unit need not be maintained until that timing. Therefore, battery saving can be facilitated.

FIG. 2 is a diagram of an example of the system 100 according to the present invention. In the system 100, measurement values measured by the sensor nodes 102 are collected whereby, for example, a change is detected in the environment of the arrangement area 103 in which the sensor nodes 102 are disposed.

For example, the system 100 has a server 201, a gateway 202, the parent devices 101, and the plural sensor nodes 102. The server 201 and the gateway 202 are connected through a network NET such as the Internet. Although not depicted, each apparatus may be connected to a user terminal through the network NET.

The server 201 collects, accumulates, and analyzes the measurement values and governs overall control of the system 100 including the gateway 202, the parent device 101, the sensor nodes 102, etc. The gateway 202 relays signals communicated between the network NET to which the server 201 and the user terminal are connected, and the sensor network SNET formed by the plural sensor nodes 102 and the parent device 101. For example, the parent device 101 collects measurement values by communicating with the sensor nodes 102 and notifies the server 201 of the collected results. Further, for example, the parent device 101, may give instructions to the sensor node 102. The plural sensor nodes 102 are communications nodes that measure a state at respective positions in the arrangement area 103. Further, the plural sensor nodes 102 are configured to wirelessly communicate with surrounding sensor nodes 102 and the parent device 101.

FIG. 3 is a diagram of an operation example of the system 100. In the system 100, at each predetermined period d, a state of a predetermined area is measured. For example, in the system 100, once every 10 minutes, a state of the predetermined area is measured by the sensor nodes 102 and measurement data is aggregated at the server via the parent device 101, the gateway 202, and the network. Therefore, to perform periodic measurement, the sensor nodes 102 have to be synchronized.

FIG. 4 is a block diagram of an example of hardware configuration of the sensor node 102. The sensor node 102 has a sensor 401, a micro control unit (MCU) 402, a timer 403, read-only memory (ROM 404), random access memory (RAM) 405, and non-volatile memory 406. The sensor node 102 further has a radio circuit 408, an antenna 409, a power management unit 410, a battery 411, a harvester 412, and the like. The sensor node 102 has an internal bus 407 connecting the sensor 401, the MCU 402, the timer 403, the ROM 404, the RAM 405, and the non-volatile memory 406. In FIG. 4, dotted lines represent power lines and solid lines represent signal lines.

The sensor 401 detects a predetermined change at the installation site. The sensor 401, for example, may be a piezoelectric element detecting pressure at the installation site, a device detecting temperature, an optoelectronic device detecting light, or the like.

The MCU 402, for example, is a control unit that performs data processing and overall control of the sensor node 102 by loading a program stored in the ROM 404 onto the RAM 405 and executing the program. For example, the MCU 402 processes data related to detection by the sensor 401. The timer 403, for example, counts a period set by the MCU 402, etc. In the present embodiment, for example, the timer 403 autonomously counts a sensing interval for sensing by the sensor 401. Further, for example, the timer 403 counts a predetermined interval of suspension of a short-range wireless communication radio circuit in a second example described hereinafter.

The ROM 404 is a memory storage unit storing therein programs executed by the MCU 402. The RAM 405 is a memory storage unit storing therein transient data of processing at the MCU 402. The non-volatile memory 406 is a memory storage unit that is writable memory and that retains predetermined data written thereto even when power supply ceases. For example, the writable non-volatile memory 406 may be flash memory.

The antenna 409 transmits and receives radio waves wirelessly communicated with other sensor nodes 102 and the gateway 202. For example, the radio circuit 408 is a radio frequency (RF) circuit. The radio circuit 408 has a reception circuit 422 that outputs as a received signal, wireless radio waves received via the antenna 409 and a transmission circuit 421 that transmits wireless radio waves as a transmission signal via the antenna 409. Transmission power of the transmission circuit 421 can be switched by the MCU 402. Transmission power is determined based on the arrangement area 103 of the sensor nodes 102, arrangement count of the sensor nodes 102, arrangement position of the parent device 101, and the like. Further, in the present embodiment, for example, each transmission power of the transmission circuit 421 is set to enable a signal to reach a predetermined distance.

The harvester 412 generates power based on energy changes in the external environment of the installation site of the sensor node 102, for example, changes in light, vibration, temperature, wireless radio waves, etc. In the example depicted in FIG. 4, although the harvester 412 is disposed singularly, configuration is not limited hereto and, for example, the harvester 412 of the same type may be disposed in plural, or the harvester 412 of differing types may be disposed in plural. The harvester 412 may generate power corresponding to changes detected by the sensor 401, or may generate power corresponding to an amount of displacement of radio waves received by the radio circuit 408. The battery 411 stores the power generated by the harvester 412. In other words, the sensor node 102 internally generates power necessary for operation, without provision a primary battery or an external power source. The power management unit 410 controls the supply of the power stored by the battery 411, as a driving power source of the components of the sensor node 102.

FIGS. 5A and 5B are diagrams of an example of assumed operation of the sensor node 102. In this example, the sensor nodes 102 perform intermittent operation. Under intermittent operation, the sensor nodes 102 switch from a sleep state described hereinafter to an activated state described hereinafter, at each predetermined period d. The predetermined period d is defined by the user. After activation, the sensor nodes 102 measure a state at the arrangement site by the sensor 401. The sensor nodes 102 transmit obtained measurement values to the parent device 101. After transmitting the measurement values to the parent device 101, the sensor nodes 102 switch from the activated state to the sleep state, respectively described hereinafter. Further, as depicted in FIG. 5A, at the sensor nodes 102 during the activated state, the remaining power level of the battery 411 decreases consequent to processing by the MCU 402, wireless transmission by the transmission circuit 421, reception by the reception circuit 422, and the like. On the contrary, at the sensor nodes 102 during the sleep state, the remaining power level of the battery 411 is increased by charging.

As depicted in FIG. 5B, during the activated state, the plural sensor nodes 102 relay transfer by multihop communication, data signals that notify the parent device 101 of measurement values obtained by the sensors 401 of the sensor nodes 102. Further, as described hereinafter, during the activated state, the sensor nodes 102 regard the transmission power of the transmission circuit 421 as a first transmission power.

FIG. 6 is a diagram of an example of power states of components. Power states of the MCU 402 include an ON state, a sleep state, and an OFF state. The ON state is a state where voltage enabling various processes of the MCU 402 is supplied to the MCU 402. The sleep state is a state where power is supplied to an interrupt circuit of the timer 403 and the MCU 402 and is not supplied to circuits having main functions such as computing of the MCU 402. Further, when the interrupt circuit of the MCU 402 receives an interrupt signal, the MCU 402 enters the ON state. The OFF state is a state where power is not supplied to the MCU 402, a state where all operations are disabled. In the present embodiment, the OFF state is not utilized.

The power states of the reception circuit 422 include an OFF state that is the first state and an ON state that is the second state. The ON state is a state where power is supplied to the reception circuit 422. The OFF state is a state where power is not supplied to the reception circuit 422 and radio waves cannot be received. The power states of the sensor 401 include an ON state and an OFF state. The ON state is a state where power is supplied to the sensor 401. The OFF state is a state where power is not supplied to the sensor 401.

For example, when the state of the sensor node 102 is the activated state, the MCU 402 is in the ON state, the reception circuit 422 is in the ON state, and the sensor 401 is in the ON state. For example, when the state of the sensor node 102 is the sleep state, the MCU 402 is in the sleep state, the reception circuit 422 is in the OFF state, and the sensor 401 is in the OFF state.

FIG. 7 is a block diagram of an example of hardware configuration of the server 201 and the parent device 101. The server 201 and the parent device 101 may have the same configuration and therefore, will be described to have the same configuration. Nonetheless, configuration is not limited hereto and, for example, the configurations may differ. The server 201 and the parent device 101 will be referred to as an apparatus 700 in FIG. 7.

The apparatus 700, unlike the sensor node 102, operates based on an external power source. The apparatus 700 has a central processing unit (CPU) 701, a timer 702, a ROM 703, RAM 704, a disk drive 705, a disk 706, and an input/output (I/O) circuit 707. The apparatus 700 further has an internal bus 711 connecting the CPU 701, the timer 702, the ROM 703, the RAM 704, the disk drive 705, and the I/O circuit 707.

Here, the CPU 701 is a control unit configured to govern overall control of the apparatus 700. The ROM 703 is a memory storage unit storing therein various programs such as a boot program. The RAM 704 is a memory storage unit used as a work area of the CPU 701. The disk drive 705, under the control of the CPU 701, controls the reading and writing of data with respect to the disk 706. The disk 706 is a memory storage unit storing therein data written thereto under the control of the disk drive 705. The disk 706 may be a magnetic disk, an optical disk, or the like. Further, when the apparatus 700 is the parent device 101, in a memory storage unit such as the ROM 703 or the disk 706, predetermined period information described hereinafter, standby period information described hereinafter, etc. is stored.

The I/O circuit 707 is connected to a wireless communications circuit 708 and an antenna 709. For example, when the apparatus 700 is the server 201, wireless communication with the parent device 101 is enabled by wireless communication with the gateway 202 via the wireless communications circuit 708 and the antenna 709. For example, when the apparatus 700 is the parent device 101, wireless communication with the sensor node 102 is enabled via the wireless communications circuit 708 and the antenna 709.

The I/O circuit 707 is further connected to a network I/F 710. Thus, the apparatus 700 is able to communicate with external apparatuses through the network I/F 710, by a protocol process such as Transmission Control Protocol (TCP)/Internet Protocol (IP) via a network such as the Internet. Wired communication or wireless communication may be applied for communication by the network I/F 710.

Although not depicted, the apparatus 700 may further include input apparatus such as a keyboard, a mouse, a touch panel, and the like where the user can directly operate the apparatus 700 through the input apparatus. Further, for example, the apparatus 700 may include output apparatus such as a display, a printer, a buzzer, and the like.

FIG. 8 is a diagram of an example of packet configuration. The synchronization request signal S1 is a signal from a sensor node 102, requesting synchronization to the parent device 101 or a synchronized sensor node 102 after the sensors node 102 have been installed in a predetermined area. The synchronization request signal S1 has an identification flag and a transmission source ID. The identification flag is a flag identifying the signal to be a synchronization request signal S1 and, for example, is "0x01". The transmission source ID is identification information identifying the transmission source of the synchronization request signal S1.

The synchronization signal S2 is a signal giving notification of synchronization timing and is transmitted from the parent device 101 or a synchronized sensor node 102 to the sensor node 102 that is the transmission source of a synchronization request signal S1. The synchronization signal S2 has an identification flag, a destination ID, a transmission source ID, predetermined period information ddata indicating the predetermined period d, timing information indicating a next activation timing, and the standby period information indicating a synchronization request standby period. The identification flag is a flag identifying the signal to be the synchronization signal S2 and, for example, is "0x10". The transmission source ID is identification information identifying the transmission source of the synchronization signal S2. The predetermined period information ddata, for example, is information indicating a period that is a measuring interval. The timing information is information indicating the timing when the MCU 402 and the sensor 401 are next activated to perform measurement. For example, the timing information may be information indicating a number of minutes, or information indicating a specific time. The standby period information is information that indicates a standby period for a synchronization request from another node 102 after completing synchronization. For example, the standby period information may be information indicating a number of minutes, or information indicating a specific time.

FIG. 9 is a diagram of an example of a functional configuration of the sensor node 102. The sensor node 102 has a global control unit 901, a receiving unit 902, a transmitting unit 903, a power control unit 904, a power storage unit 905, and a memory storage unit 906. The receiving unit 902 is implemented by the reception circuit 422. The transmitting unit 903 is implemented by the transmission circuit 421. The power control unit 904 is implemented by the power management unit 410. The memory storage unit 906, for example, is implemented by the ROM 404, the RAM 405, and the non-volatile memory 406 depicted in FIG. 4, or the like. The global control unit 901, for example, is implemented by the MCU 402 and the timer 403 depicted in FIG. 4, or the like. Further, processes of the global control unit 901, for example, are encoded in a program stored in the memory storage unit 906 accessed by the MCU 402 depicted in FIG. 4. The MCU 402 reads out the program from the memory storage unit 906 and executes a process encoded in the program. Thus, processes of the global control unit 901 are implemented. Process results of the units, for example, are stored to the memory storage unit 906. The power storage unit 905 has a function of autonomously storing power supplied to each component. The power storage unit 905, for example, is the battery 411 depicted in FIG. 4.

FIG. 10 is a diagram of an example of a functional configuration of the parent device 101. The parent device 101 has a control unit 1001, a receiving unit 1002, a transmitting unit 1003, and a memory storage unit 1004. The memory storage unit 1004, for example, is implemented by the ROM 703, the RAM 704, and the disk 706 depicted in FIG. 7, or the like. The receiving unit 1002 and the transmitting unit 1003, for example, are implemented by the wireless communications circuit 708 depicted in FIG. 7. The control unit 1001 is implemented by the CPU 701 depicted in FIG. 7. Processes of the control unit 1001, for example, are encoded in a program stored in the memory storage unit 1004 accessed by the CPU 701. The CPU 701 reads out the program from the memory storage unit 1004 and executes an encoded process in the program. Thus, processes of the control unit 1001 are implemented. Process results of the units, for example, are stored to the memory storage unit 1004.

The global control unit 901 depicted in FIG. 9 performs control such that the synchronization request signal S1 is transmitted by the transmitting unit 903, when the stored power level of the power storage unit 905 becomes a predetermined level or greater. For example, upon receiving an interrupt such as charge completion, the global control unit 901 switches, via the power control unit 904, the state of the sensor node 102 from the sleep state to the activated state. As described above, in the sleep state of the sensor node 102, the MCU 402 is in the sleep state, the sensor 401 and the reception circuit 422 are in the OFF state, and the timer 403 is in an active state. Further, since the MCU 402 is in the sleep state, operation concerning an interrupt function is enabled and therefore, an interrupt from the timer 403 or the power management unit 410, etc. can be received. During the activated state of the sensor node 102, the sensor 401, the MCU 402, and the reception circuit 422 are in the ON state.

The global control unit 901 generates the synchronization request signal S1. The transmitting unit 903 transmits the synchronization request signal S1 generated by the global control unit 901. The receiving unit 902 receives the synchronization signal S2 in response to the synchronization request signal S1 transmitted by the transmitting unit 903.

For example, if the sensor node 102 is close to the parent device 101, the receiving unit 1002 depicted in FIG. 10 receives the synchronization request signal S1 transmitted from the transmitting unit 903 depicted in FIG. 9. The control unit 1001 depicted in FIG. 10 generates a synchronization signal S2 for the synchronization request signal S1 received by the receiving unit 1002. The transmitting unit 1003 transmits the synchronization signal S2 generated by the control unit 1001. A detailed example of generation of the synchronization signal S2 is depicted in FIG. 16. The synchronization signal S2 for the synchronization request signal S1 is a signal for which the destination ID, which is included in the synchronization signal S2, indicates the sensor node 102 that transmitted the synchronization request signal S1. The global control unit 901 depicted in FIG. 9 stores to the memory storage unit 906, the predetermined period information ddata included in the synchronization signal S2 received by the receiving unit 902.

After the synchronization signal S2 is received by the receiving unit 902, if a synchronization request signal S1 from another sensor node 102 is received, the global control unit 901 performs control such that the transmitting unit 903 transmits a synchronization signal S2 that is based on the received synchronization signal S2, in response to the received synchronization request signal S1. The power control unit 904 controls the receiving unit 902 such that state of the receiving unit 902 becomes the first state, after a certain period elapses from the receiving unit 902 receiving the synchronization signal S2. The certain period, for example, is a standby period indicated by standby period information stdata included in the synchronization signal S2. The standby period, for example, is timed by the timer 403.

Further, for example, the global control unit 901 sets the timing indicated by the timing information included in the synchronization signal S2 into the timer 403. For example, the global control unit 901 switches, via the power control unit 904, the state of the sensor node 102 from the activated state to the sleep state. Thus, at the next synchronization timing, an interrupt of the timer 403 occurs.

If the receiving unit 902 has not received the synchronization signal S2 before a certain period elapses after the transmitting unit 903 transmits the synchronization request signal S1, the power control unit 904 controls the receiving unit 902 such that the state of the receiving unit 902 becomes the first state. Here, the certain period, for example, is a value predefined by the designer or user. Information indicating the certain period, for example, is pre-stored to the memory storage unit 906. Further, the certain period is timed by the timer 403. As described above, the first state of the receiving unit 902 is the OFF state. Further, for example, if the receiving unit 902 does not receive the synchronization signal S2 before the elapse of the certain period after the transmitting unit 903 transmits the synchronization request signal S1, the power control unit 904 may set the state of the sensor node 102 to the sleep state.

If the receiving unit 902 receives a synchronization request signal S1 from another sensor node 102 after receiving the synchronization signal S2, the global control unit 901 performs control to cause the transmitting unit 903 to transmit in response to the received synchronization request signal S1, a synchronization signal S2 that is based on the received synchronization signal S2.

If the receiving unit 902 does not receive the synchronization signal S2 before the certain period elapses from the transmitting unit 903 transmitting the synchronization request signal S1, the power control unit 904 controls the receiving unit 902 such that the state of the receiving unit 902 becomes the first state.

When receiving an interrupt by the timer 403, the global control unit 901 controls the power control unit 904 to change the state of the sensor node 102 from the sleep state to the activated state. The global control unit 901 performs control such that the state of the installation site of the sensor 401 is measured. Subsequently, the global control unit 901 performs control such that the transmitting unit 903 transmits a data signal that includes measurement results. If the receiving unit 902 receives a data signal from another sensor node 102 other than that of the global control unit 901, the global control unit 901 performs control such that the received data signal is transmitted by the transmitting unit 903. When completing data signal transmission and transfer, the global control unit 901 controls the power control unit 904 to switch the state of the sensor node 102 from the activated state to the sleep state.

Based on the processes of the above units, an operation example of the system 100 will be described with reference to FIG. 11 and an example of a timing chart of the system 100 will be described with reference to FIG. 12.

Figure 11:
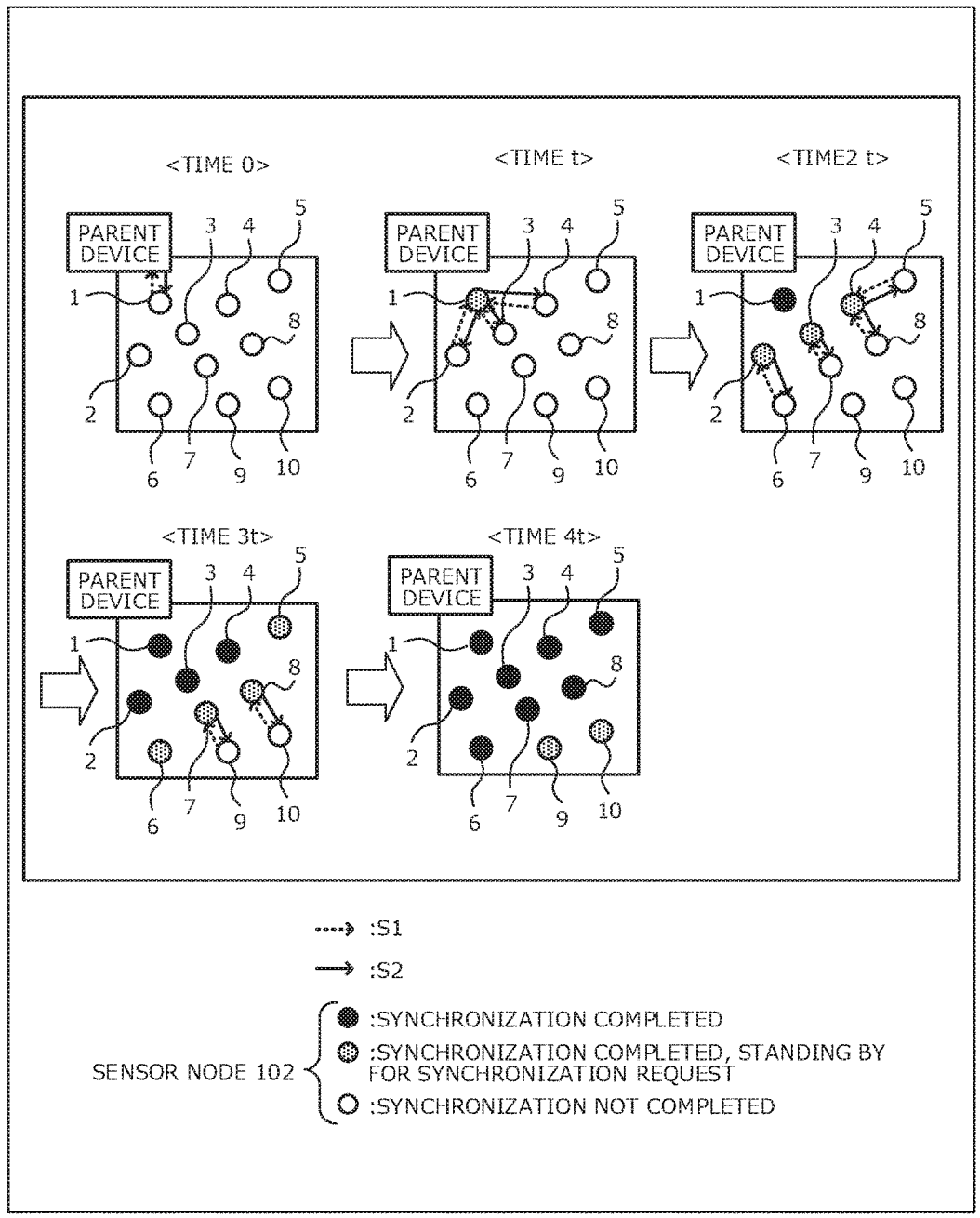
FIG. 11 is a diagram of an example of transmission and reception of a synchronization signal S2 and a synchronization request signal S1.

FIG. 11 is a diagram of an example of transmission and reception of the synchronization signal S2 and the synchronization request signal S1. In the example depicted in FIG. 11, in the predetermined area, the sensor nodes 102-1 to 102-10 are arranged. For example, the sensor nodes 102 transmit the synchronization signal S2 triggered by charge completion.

At <time 0>, the parent device 101 receives a synchronization request signal S1 transmitted from the sensor node 102-1. In the example depicted in FIG. 11, the distance of the parent device 101 and the sensor nodes 102-2 to 102-10 is greater than the distance that can be reached by the transmission strength of the synchronization request signal S1. Therefore, the synchronization request signals S1 from the sensor nodes 102-2 to 102-10 do not reach the parent device 101. At <time 0>, the parent device 101 transmits a synchronization signal S2 to the sensor node 102-1, which is the transmission source of the received synchronization request signal S1. The sensor node 102-1, when receiving the synchronization signal S2 transmitted from the parent device 101, stores to the non-volatile memory 406, the predetermined period d specified by the synchronization signal S2. The sensor node 102-1 sets the timer 403 such that activation occurs after the next activation timing specified by the synchronization signal S2. The sensor node 102-1 sets the standby period specified by the synchronization signal S2 into the timer 403 whereby, standby for a synchronization request signal S1 occurs from the reception of the synchronization signal S2 until the elapse of the standby period.

A <time t>, the sensor node 102-1, when receiving synchronization request signals S1 from the sensor nodes 102-2 to 102-4 respectively, transmits the synchronization signal S2 to the sensor nodes 102-2 to 102-4. The sensor node 102-1, when the standby period elapses, transitions to the sleep state. The sensor nodes 102-2 to 102-4, when receiving the synchronization signal S2 from the sensor node 102-1, store to the non-volatile memory 406, the predetermined period d specified by the synchronization signal S2. The sensor nodes 102-2 to 102-4 set the timer 403 such that activation occurs after the next activation timing specified by the synchronization signal S2. The sensor nodes 102-2 to 102-4 set the standby period specified by the synchronization signal S2 into the timer 403 whereby, standby for a synchronization request signal S1 occurs from the reception of the synchronization signal S2 until the elapse of the standby period.

At <time 2t>, the sensor node 102-2, when receiving the synchronization request signal S1 transmitted from the sensor node 102-6, transmits the synchronization signal S2 to the sensor node 102-6. The sensor node 102-2, when the standby period elapses, transitions to the sleep state. The sensor node 102-6, when receiving the synchronization signal S2 from the sensor node 102-2, stores to the non-volatile memory 406, the predetermined period d specified by the synchronization signal S2. The sensor node 102-6 sets the timer 403 such that activation occurs after the next activation timing specified by the synchronization signal S2. The sensor node 102-6 sets the standby period specified by the synchronization signal S2 into the timer 403 whereby, standby for a synchronization request signal S1 occurs from the reception of the synchronization signal S2 until the elapse of the standby period.

Further, at <time 2t>, the sensor node 102-3, when receiving the synchronization request signal S1 transmitted from the sensor node 102-7, transmits the synchronization signal S2 to the sensor node 102-7. The sensor node 102-3, when the standby period elapses, transitions to the sleep state. The sensor node 102-7, when receiving the synchronization signal S2 from the sensor node 102-3, stores to the non-volatile memory 406, the predetermined period d specified by the synchronization signal S2. The sensor node 102-7 sets the timer 403 such that activation occurs after the next activation timing specified by the synchronization signal S2. The sensor node 102-7 sets the standby period specified by the synchronization signal S2 into the timer 403 whereby, standby for a synchronization request signal S1 occurs from the reception of the synchronization signal S2 until the elapse of the standby period.

Further, at <time 2t>, the sensor node 102-4, when receiving the synchronization request signals S1 transmitted from the sensor nodes 102-5 and 102-8, transmits the synchronization signal S2 to the sensor nodes 102-5 and 102-8. The sensor node 102-4, when the standby period elapses, transitions to the sleep state. The sensor node 102-5 and the sensor node 102-8, when receiving the synchronization signal S2 from the sensor node 102-4, store to the non-volatile memory 406, the predetermined period d specified by the synchronization signal S2. The sensor node 102-5 and the sensor node 102-8 set the timer 403 such that activation occurs after the next activation timing specified by the synchronization signal S2. The sensor node 102-5 and the sensor node 102-8 set the standby period specified by the synchronization signal S2 into the timer 403 whereby, standby for a synchronization request signal S1 occurs from the reception of the synchronization signal S2 until the elapse of the standby period.

At <time 3t>, the sensor node 102-7, when receiving the synchronization request signal S1 transmitted from the sensor node 102-9, transmits the synchronization signal S2 to the sensor node 102-9. The sensor node 102-7, when the standby period elapses, transitions to the sleep state. The sensor node 102-9, when receiving the synchronization signal S2 from the sensor node 102-7, stores to the non-volatile memory 406, the predetermined period d specified by the synchronization signal S2. The sensor node 102-9 sets the timer 403 such that activation occurs after the next activation timing specified by the synchronization signal S2. The sensor node 102-9 sets the standby period specified by the synchronization signal S2 into the timer 403 whereby, standby for a synchronization request signal S1 occurs from the reception of the synchronization signal S2 until the elapse of the standby period.

Further, at <time 3t>, the sensor node 102-8, when receiving the synchronization request signal S1 transmitted from the sensor node 102-10, transmits the synchronization signal S2 to the sensor node 102-10. The sensor node 102-8, when the standby period elapses, transitions to the sleep state. The sensor node 102-10, when receiving the synchronization signal S2 from the sensor node 102-8, stores to the non-volatile memory 406, the predetermined period d specified by the synchronization signal S2. The sensor node 102-10 sets the timer 403 such that activation occurs after the next activation timing specified by the synchronization signal S2. The sensor node 102-10 sets the standby period specified by the synchronization signal S2 into the timer 403 whereby, standby for a synchronization request signal S1 occurs from the reception of the synchronization signal S2 until the elapse of the standby period.

At <time 4t>, although the sensor node 102-9 and the sensor node 102-10 are standing by for a synchronization request signal S1, since the sensor nodes 102 have completed synchronization, the sensor nodes 102 do not receive the synchronization signal S2. The sensor node 102-9 and the sensor node 102-10, when the standby period elapses, transition to the sleep state.

As described above, when completing synchronization, the sensor nodes 102 perform measurement at each predetermined period d, and transfer measurement data to the parent device 101 by relay transfer via multihop communication.

Figure 12:
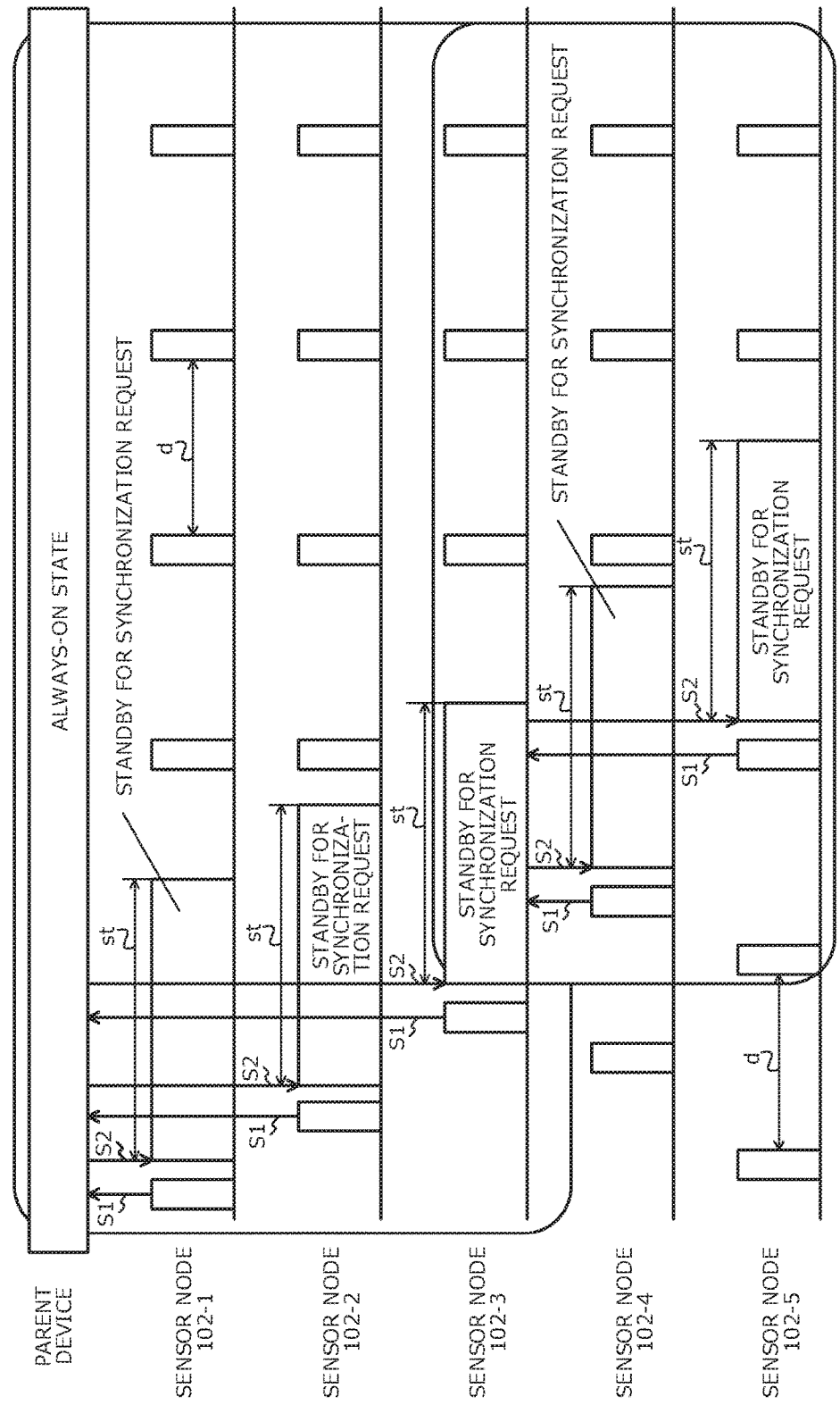
FIG. 12 is a diagram of an example of a timing chart related to transmission and reception of the synchronization request signal S1 and the synchronization signal S2.

FIG. 12 is a diagram of an example of a timing chart related to transmission and reception of the synchronization request signal S1 and the synchronization signal S2. The sensor node 102-1 transmits a synchronization request signal S1 and receives the synchronization signal S2 from the parent device 101. The sensor node 102-1 stands by for a synchronization request signal S1. Thereafter, when a standby period st elapses, the sensor node 102-1 performs measurement by the sensor 401, at each predetermined period d.

The sensor node 102-2 transmits a synchronization request signal S1 and receives the synchronization signal S2 from the parent device 101. The sensor node 102-2 stands by for a synchronization request signal S1. Thereafter, the sensor node 102-2, when the standby period st elapses, the sensor node 102-2 performs measurement by the sensor 401, at each predetermined period d.

The sensor node 102-3 transmits a synchronization request signal S1 and receives the synchronization signal S2 from the parent device 101. The sensor node 102-3 stands by for a synchronization request signal S1. The sensor node 102-4 and the sensor node 102-5 transmit a synchronization request signal S1 and receive the synchronization signal S2 from the sensor node 102-3. When the standby period st elapses, the sensor node 102-3 performs measurement by the sensor 401 at each predetermined period d. The sensor node 102-4 and the sensor node 102-5 standby for a synchronization request signal S1. Thereafter, the sensor node 102-4 and the sensor node 102-5, when the standby period st elapses, perform measurement by the sensor 401, at each predetermined period d. The transmission interval of the synchronization request signal S1 is not particularly limited.

FIG. 13 is a flowchart of an example of a process procedure performed by the sensor node 102 when synchronization has not been completed. The sensor node 102 switches from the sleep state to the activated state triggered by charge completion (step S1301). The sensor node 102 transmits a synchronization request signal S1 (step S1302). For example, notification of charge completion is given by the transmission of an interrupt signal from the power management unit 410 to the MCU 402. The sensor node 102 determines whether the synchronization signal S2 has been received (step S1303).

If the synchronization signal S2 has been received (step S1303: YES), the sensor node 102 stores the predetermined period d to the non-volatile memory 406 (step S1304). The sensor node 102 sets an interrupt for the timer 403 such that activation occurs at the next activation timing (step S1305). The sensor node 102 stands by for a synchronization request period (step S1306), and transitions to step S1307. A process procedure performed by the sensor node 102 during standby for a synchronization request is depicted in FIG. 14.

If the synchronization signal S2 is not received before a certain period elapses after the transmission of the synchronization request signal S1 (step S1303: NO), the sensor node 102 switches from the activated state to the sleep state (step S1307), ending a series of operations. As described, in the sleep state here, the MCU 402 is in the sleep state, the sensor 401 and the reception circuit 422 are in the OFF state, and the timer 403 is in an active state. Further, since the MCU 402 is in the sleep state, operation concerning an interrupt function is enabled and therefore, an interrupt from the timer 403 can be received.

FIG. 14 is a flowchart of a process procedure of the sensor node 102 during standby for a synchronization request. The sensor node 102 obtains the current time from the timer 403, triggered by reception of a synchronization request signal S1 (step S1401). The sensor node 102 obtains the next planned activation time (step S1402). The sensor node 102 obtains the next activation timing by subtracting the current time from the next planned activation time (step S1403). The sensor node 102 transmits the synchronization signal S2 (step S1404), ending a series of operations.

FIG. 15 is a flowchart of an example of a process procedure performed by the sensor node 102 when synchronization has been completed. The sensor node 102 switches to the activated state, triggered by an interrupt of the timer 403 (step S1501). The sensor node 102 sets an interrupt for the timer such that activation occurs after the predetermined period d (step S1502). The sensor node 102 performs periodic measurement (step S1503). The sensor node 102 switches to the sleep state (step S1504), ending a series of operations. Here, in the sleep state, the MCU 402 is in the sleep state, the sensor 401 and the reception circuit 422 are in the OFF state, and the timer 403 is in an active state. Further, since the MCU 402 is in the sleep state, operation concerning an interrupt function is enabled and therefore, an interrupt from the timer 403 can be received.

FIG. 16 is a flowchart of an example of a process procedure performed by the parent device 101. The parent device 101 obtains the current time from the timer, triggered by reception of a synchronization request signal S1 (step S1601). The parent device 101 obtains the remainder of the current time divided by the predetermined period d (step S1602). The parent device 101 subtracts the calculated remainder from the predetermined period d to obtain the next activation timing (step S1603). The parent device 101 transmits the synchronization signal S2 (step S1604), ending a series of operations.

As described, the sensor nodes 102 switch the reception circuit from the OFF state to the ON state and request transmission of a synchronization signal, whereby the synchronization signal is received, enabling the interval during which the reception circuit is continuously in the ON state to be shortened. As a result, battery saving can be facilitated.

The sensor node 102, when receiving a synchronization request signal from another sensor node 102 after receiving the synchronization signal, transmits a synchronization signal based on the received synchronization signal, in response to the received synchronization request signal. Thus, a sensor node 102 that has completed synchronization can transmit a synchronization signal in place of the parent device whereby, energy saving can be facilitated as compared to a case where the sensor nodes 102 transmit a synchronization request signal by a transmission power that can reach the parent device.

The sensor node 102 switches the reception circuit to the OFF state, after a certain period from the reception of the synchronization signal elapses. As a result, by performing intermittent operation after completing transmission of a synchronization signal in response to a synchronization request signal from other sensor nodes 102 by short-range wireless communication, energy saving can be facilitated.

The sensor node 102 transmits a synchronization request signal when the stored power level of the battery is a predetermined level or greater. As a result, transmission and reception of a synchronization request signal and a synchronization signal can be performed at an autonomous timing. Therefore, battery saving can be facilitated.

The sensor node 102 performs control such that the state of the receiving unit becomes the first state, when no synchronization signal is received before the elapse of a certain period after the transmission of the synchronization request signal. As a result, intermittent operation is realized whereby, battery saving is facilitated.

Multihop communication is performed cyclically. As a result, the state of the arrangement area is periodically measured.

The synchronizing method described in the present embodiments can be realized by executing a prepared synchronization program on the MCU 402. The synchronization program is stored to a recording medium that is readable by the MCU 402, such as the ROM 404 and the non-volatile memory 406, and is read from the recording medium by the MCU 402 for execution. Further, the synchronization may be distributed by multihop communication from the parent device 101.

According to one aspect of the present invention, battery saving of communications nodes is facilitated.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communications node included among a plurality of communications nodes that transfer data to a communications apparatus by multihop communication, the communications node comprising:
    a transmitting circuit configured to transmit a synchronization request signal requesting transmission of a synchronization signal for synchronizing the multihop communication at the communications node;
    a receiving circuit configured to receive the synchronization signal in response to the synchronization request signal transmitted by the transmitting circuit; and
    a power control circuit configured to control the receiving circuit such that a state of the receiving circuit remains to be a first state where power consumption of the receiving circuit is a first power until the transmitting circuit transmits the synchronization request signal and switches to a second state where the power consumption of the receiving circuit is a second power that is higher than the first power upon the transmitting circuit transmitting the synchronization request signal.

2. The communications node according to claim 1, further comprising
    a control circuit configured to perform control such that when the receiving circuit receives the synchronization request signal of a second communications node among the plurality of communications nodes after receiving the synchronization signal, the transmitting circuit transmits the synchronization signal based on the received synchronization signal, in response to the synchronization request signal received by the receiving circuit from the second communications node.

3. The communications node according to claim 2, wherein
    the power control circuit controls the receiving circuit such that the state of the receiving circuit becomes the first state, after a certain period elapses after the receiving circuit receives the synchronization signal.

4. The communications node according to claim 2, further comprising
    a power storage unit configured to store power supplied to the receiving circuit, wherein
    the control circuit performs control such that the transmitting circuit transmits the synchronization request signal, when a stored power level of the power storage unit is at least a predetermined level.

5. The communications node according to claim 4, wherein
    the power control circuit controls the receiving circuit such that the state of the receiving circuit becomes the first state when the receiving circuit does not receive the synchronization signal before a certain period elapses after the transmitting circuit transmits the synchronization request signal.

6. The communications node according to claim 1, wherein
    the multihop communication is performed cyclically.

7. A system comprising:
    a communications apparatus; and
    a plurality of communications nodes that transfer data to the communications apparatus by multihop communication, wherein
    a first communications node among the plurality of communications nodes:
        switches a state of a receiving circuit from a first state where power consumption of the receiving circuit is a first power to a second state where the power consumption of the receiving circuit is a second power that is higher than the first power,
        transmits by a transmitting circuit, a synchronization request signal requesting transmission of a synchronization signal for synchronizing the multihop communication at the first communications node, and
        receives by a receiving circuit, the synchronization signal in response to the synchronization request signal transmitted by the transmitting circuit,
    wherein the receiving circuit remains to be in the first state until the transmitting circuit transmits the synchronization request signal, and
    the first communications node switches the state of the receiving circuit from the first state to the second state upon the transmitting circuit transmitting the synchronization request signal.

8. The system according to claim 7, wherein
    the communications apparatus, when receiving the synchronization request signal transmitted from a second communications node among the plurality of communications nodes, transmits the synchronization signal in response to the received synchronization request signal.

9. A synchronizing method comprising:
    switching a state of a receiving circuit from a first state where power consumption of the receiving circuit is a first power to a second state where the power consumption of the receiving circuit is a second power that is higher than the first power,
    transmitting by a transmitting circuit, a synchronization request signal requesting transmission of a synchronization signal for synchronizing multihop communication at a communications node, and receiving by receiving circuit, the synchronization signal in response to the synchronization request signal transmitted by the transmitting circuit, wherein the switching, transmitting, and receiving are performed by a communications node included among a plurality of communications nodes that transfer data to a communications apparatus by the multihop communication, the receiving circuit remains to be in the first state until the transmitting circuit transmits the synchronization request signal, and the switching switches the receiving circuit from the first state to the second state upon the transmitting circuit transmitting the synchronization request signal.

* * * * *